US009288406B2

(12) United States Patent
Kulakov (10) Patent No.: US 9,288,406 B2
(45) Date of Patent: Mar. 15, 2016

(54) SUBLIMINAL FRAME INSERTION (75) Inventor: Peter Alekseyevich Kulakov, Kharkov (UA)

(73) Assignee: EchoStar Ukraine L.L.C., Kharkiv (UA)

( * ) Notice: Subject to any disclaimer, the term of this patent is extended or adjusted under 35 U.S.C. 154(b) by 0 days.

(21) Appl. No.: 13/825,544

(22) PCT Filed: Sep. 21, 2010

(86) PCT No.: PCT/UA2010/000067
§ 371 (c)(1),
(2), (4) Date: May 2, 2013

(87) PCT Pub. No.: WO2012/039695
PCT Pub. Date: Mar. 29, 2012

(65) Prior Publication Data
US 2013/0216204 A1    Aug. 22, 2013

(51) Int. Cl.
*H04N 5/76*     (2006.01)
*H04N 5/265*    (2006.01)
(Continued)

(52) U.S. Cl.
CPC ............... *H04N 5/265* (2013.01); *H04N 7/163* (2013.01); *H04N 21/23892* (2013.01); *H04N 21/435* (2013.01); *H04N 21/44008* (2013.01); *H04N 21/458* (2013.01); *H04N 21/45457* (2013.01);
(Continued)

(58) Field of Classification Search
CPC ............ H04N 7/163; H04N 21/23892; H04N 21/435; H04N 21/44008; H04N 5/265; H04N 21/458; H04N 21/47205; H04N 21/475; H04N 21/8153; H04N 21/45457

USPC .......................................................... 386/278
See application file for complete search history.

(56) References Cited

U.S. PATENT DOCUMENTS 5,017,143 A  *  5/1991   Backus et al. ................. 434/236
5,027,208 A  *  6/1991   Dwyer et al. ................. 348/516
(Continued)

FOREIGN PATENT DOCUMENTS

EP           0 713 335 A2    5/1996

OTHER PUBLICATIONS

PCT International Search Report for PCT/UA2010/000067; May 20, 2011; 5pp.
PCT International Preliminary Report for PCT/UA/2010/000067; Jan. 29, 2013; 6pp.
Levy, Steven; "The Selling of the Subliminal. 1984 has arrived and nothing expresses it better than Expandovision"; Popular Computing; Apr. 1984; 70, 75-78 (5 pages).

*Primary Examiner* — William Tran
(74) *Attorney, Agent, or Firm* — Seed IP Law Group PLLC (57) ABSTRACT

Insertion of subliminal frames in content is performed at a content receiver. The content receiver may receive content, analyze a setting, and modify the received content based on the analyzed setting. The content receiver may modify the received content by periodically inserting subliminal frames in the received content as specified by the setting. In some implementations, the content may include video content and the subliminal frames may be one or more images. The inserted subliminal frames may be subliminally perceptible but consciously imperceptible by a human viewer of the content when the content is played. As such, viewing of the content that includes the inserted subliminal frames may result in subliminal learning by a human viewer. In various implementations, one or more conditions included in the analyzed setting may specify that certain subliminal frames are to be inserted when the content has certain characteristics, such as a rating or description.

18 Claims, 7 Drawing Sheets

(51) Int. Cl.
*H04N 7/16* (2011.01)
*H04N 21/2389* (2011.01)
*H04N 21/435* (2011.01)
*H04N 21/44* (2011.01)
*H04N 21/4545* (2011.01)
*H04N 21/458* (2011.01)
*H04N 21/472* (2011.01)
*H04N 21/475* (2011.01)
*H04N 21/81* (2011.01)

(52) U.S. Cl.
CPC ....... *H04N 21/475* (2013.01); *H04N 21/47205* (2013.01); *H04N 21/8153* (2013.01)

(56) References Cited

U.S. PATENT DOCUMENTS

| | | | |
|---|---|---|---|
| 5,221,962 A * | 6/1993 | Backus et al. | 348/563 |
| 6,057,846 A * | 5/2000 | Sever, Jr. | 345/419 |
| 6,591,058 B1 * | 7/2003 | O'Connor et al. | 386/248 |
| 8,094,728 B2 | 1/2012 | Morris | |
| 2004/0034874 A1 | 2/2004 | Hord et al. | |
| 2008/0096286 A1 | 4/2008 | Jackowski et al. | |
| 2009/0180025 A1 * | 7/2009 | Dawson | 348/578 |
| 2010/0115548 A1 * | 5/2010 | Leyvi | 725/34 |

* cited by examiner

DON'T
SMOKE

SUBLIMINAL FRAME INSERTION

FIELD OF THE INVENTION

This disclosure relates generally to processing received content, and more specifically to periodic insertion of subliminal frames in received content for subliminal learning.

SUMMARY

The present disclosure discusses systems, and methods for subliminal frame insertion at a content receiver. A content receiver may receive content, analyze a subliminal frame insertion setting, and modify the received content based on the analyzed setting. The content receiver may modify the received content by periodically inserting subliminal content frames in the received content. The content receiver may modify the received content when it is received, during storage of the received content, when the received content is provided to an associated display device, and so on. The inserted subliminal content frames may be subliminally perceptible but consciously imperceptible by a human viewer of the content when the content is played. As such, viewing of the content that includes the inserted subliminal content frames may result in subliminal learning by a human viewer.

The subliminal frame insertion setting may be set based on user input and may specify subliminal content frames to insert, the location of the subliminal content frames, one or more conditions for insertion, and so on. In some implementations, the conditions included in the subliminal frame insertion setting may specify that certain subliminal content frames are to be inserted when the content has certain characteristics, such as a rating or description. The content may be determined to have characteristics satisfying such a condition by analyzing information about the content included in an electronic programming guide.

In various implementations, the content receiver may insert the subliminal content frames in the received content by replacing one or more frames of the received content with the subliminal content frames. However, in various other implementations the content receiver may insert the subliminal content frames in the received content by adding the subliminal content frames in addition to the existing frames of the received video content.

In some implementations, the content may include video content and the subliminal content frames may be one or more images. However, in other implementations, the content and/or the subliminal content may each include one or more various kinds of content, such as video, audio, data, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content receivers include devices such as set top boxes, cable boxes, digital versatile disc (DVD) players, video cassette recorders, compact disc (CD) players, radios, audio cassette players, digital video recorders, digital music players, personal computers, mobile computers, cellular telephones, and so on. Content receivers generally process and play content received from one or more content providers via one or more transmission media. The content providers may be satellite programming providers, cable programming providers, on-demand video providers, Internet content providers, DVD distributors, and so on. The transmission media may include communication link such as wired or wireless communication links, satellite communication links, coaxial communication links, fiber optic communication links, the Internet, cellular communication links, and so on. The transmission media may also include distribution (such as by mail, retail sales, and so on) of storage media such as DVDs, video cassettes, audio cassettes, compact discs, and so on.

The human brain is able to receive stimuli, such as visual stimuli, auditory stimuli, and so on. In order for a human being to consciously perceive stimuli that his brain detects, the brain typically perceives the stimuli for a sufficiently long threshold of time such that the brain is able to consciously process the perceived stimuli. However, even if the brain does not perceive the stimuli for a long enough threshold of time to enable conscious processing, the brain may still detect that the stimuli occurred. Thus, such stimuli may be subliminally perceptible by the human being even if it is not consciously perceptible. Subliminally perceptible stimuli may be able to influence the emotions, behavior, and so on of a human observer, even though the observer is unable to consciously perceive and recognize the presence of the stimuli.

Thus, subliminal learning may be possible by embedding subliminal content in content that is played for a human viewer. The subliminal content may be of a duration when played such that the brain of a human viewer of the played content is able to recognize the presence of the subliminal content but is not able to consciously process the recognized subliminal content. The subliminal learning that is possible may depend on the message presented by the subliminal content. Such a message presented by subliminal content may include learning of information (such as memorizing times tables, learning foreign languages, and so on), behavior modification (such as encouraging proper diet, weight loss, smoking cessation, gambling cessation, and so on), performing therapy (such as encouraging pleasant emotions, reducing stress, and so on), and so on.

Content that is received by a content receiver may already include such subliminal content. Such subliminal content may be embedded in the content by the respective content provider. However, in such a case the owner of the content receiver has little control over the subliminal content. It is unlikely that the owner of the content received will be able to persuade the content provider to include subliminal content that the owner desires in the content that the content receiver receives. The time, effort, and expense for the content provider to customize the content for this particular owner would likely be prohibitive.

The present disclosure discloses systems and methods of subliminal frame insertion that may be performed at a content receiver. Because subliminal content can be inserted at the content receiver, the owner of the content receiver may be able to customize received content to include subliminal content tailored to the owner's wishes. As such, the owner of the content receiver can control the subliminal learning that is possible via the subliminal content that he selects to insert.

Figure 1:
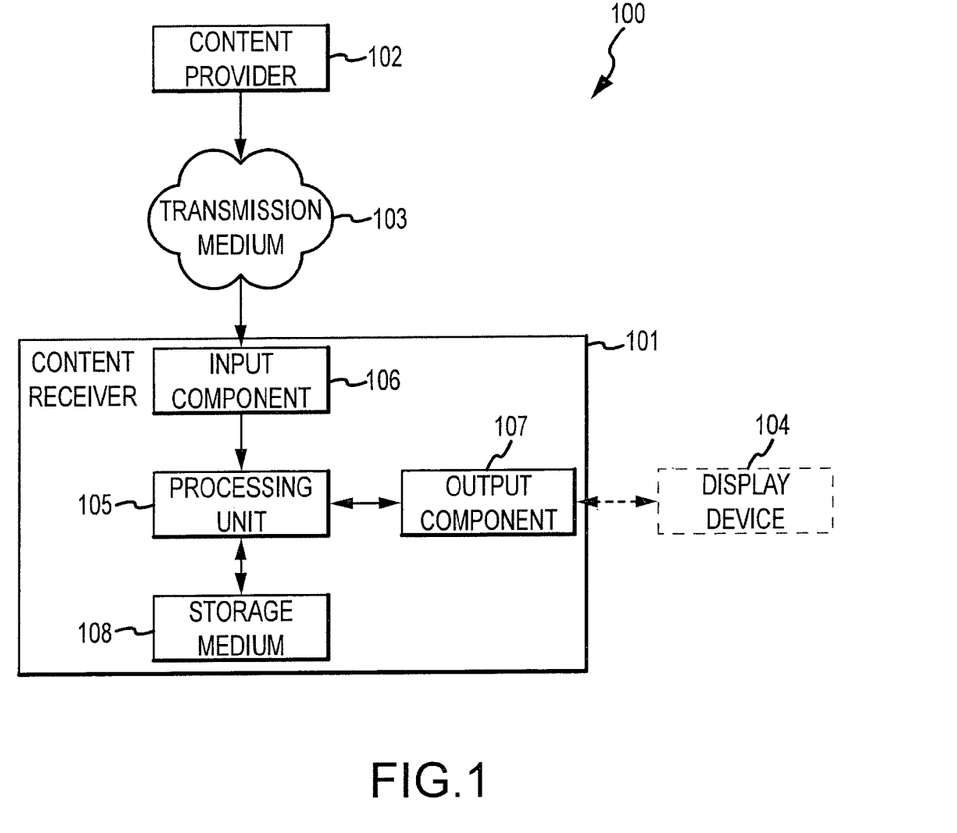
FIG. 1 is a block diagram illustrating a system for subliminal frame insertion.

FIG. 1 is a block diagram illustrating a system 100 for subliminal frame insertion. The system 100 includes a content receiver 101 and a content provider 102. The content provider may provide content to the content receiver via a transmission medium utilizing a transmitter medium 103. The transmission medium may include any kind of transmission medium (wired, wireless, and so on) such as satellite, coaxial, fiber optic, the Internet, and so on. The transmission media may even include distribution (such as by mail, retail sales, and so on) of storage media such as DVDs, video cassettes, audio cassettes, compact discs, and so on. The content may include television programming, video on demand, audio programming, and so on.

The content receiver 101 may be any kind of content receiver, such a television receiver, a set top box, a cable box, a computer, a DVD player, a CD player, a radio, a digital video recorder, a digital music player, and so on, that receives content provided by the content provider 102. The content receiver may include one or more processing units 105, a storage medium 108 (which may be any non-transitory machine-readable storage medium), an input component 106, and one or more output components 107. The content receiver may be operable to store content that is received by the input component in the storage medium. In some implementations, the content receiver may process content that is received and/or content that is stored in the storage medium for play on an associated display device 104 (such as one or more televisions, speakers, computer monitors, and so on). The processing unit may execute software instructions stored in the storage medium to receive content provided by the content provider, process such content, display processed content on the associated display device via the output component, and/or insert one or more frames of subliminal content in received content based on a subliminal frame insertion setting.

The processing unit 105 may analyze the subliminal frame insertion setting at various times during operation of the content receiver 101. These various times may include when content is received, when content is stored, when content is played, and so on. Based on the analysis of the subliminal frame insertion setting, the processing unit may insert one or more frames of subliminal content in content received by the content receiver. Subsequently, the content receiver 101 may provide the content including the inserted frames of subliminal content to a display device 104 via the output component 107. When the content including the inserted subliminal content is played, the subliminal content may be subliminally perceptible yet consciously imperceptible to a human viewer. Thus, subliminal learning by the human viewer may be accomplished by that human viewer viewing the subliminal content included in the playing content.

The subliminal frame insertion setting may be stored in the storage medium 108. The subliminal frame insertion setting may include information regarding when to insert subliminal content, the location of subliminal content to insert, whether to replace content with the subliminal content when inserting, conditions to be satisfied when inserting subliminal content, and so on.

For example, the subliminal frame insertion setting may specify to insert subliminal content when content is received and to replace the 25th frame of each second of the content with a particular specific subliminal content frame. As such, based on the subliminal frame insertion setting, the processing unit 105 may replace the 25th frame of each second of content as it is received with the particular specific subliminal content frame. By way of a second example, the subliminal frame insertion setting may specify to insert subliminal content when content is played and to insert a first subliminal content frame in the 10th frame of each second of the content and a second subliminal content frame in the 20th frame. The processing unit may therefore insert the first and second subliminal content frames as specified by the subliminal frame insertion setting. By way of a third example, the subliminal frame insertion setting may specify to insert frames in content while the content is stored in the storage medium and to replace a successive frame of each second of content (such as the 24th frame of one second of content, the 25th frame of the next second of content, and so on) with a particular specific subliminal frame content. During storage of the content the processing unit may thus replace the appropriate successive frames. Thus, the processing unit may periodically insert different numbers of subliminal content frames at different frames in the content and at different times depending on the specifications in the subliminal frame insertion setting.

In some implementations, the specifications included in the subliminal frame insertion setting may be set based on user input, such as input received from a user via the input component 106. In such implementations, the input component may receive input from a user via one or more user interface devices (not shown) such as a remote control device, one or more user selection elements incorporated into the content receiver 101, and so on. Through such input, the user may select the subliminal content that will be inserted as well as how and when such content will be inserted. The user's selections may then be recorded in the subliminal frame insertion setting.

The subliminal content the user selects to insert may be stored in the storage medium 108. In some implementations, the content receiver 101 may include functionality allowing a user to create subliminal content utilizing the input component 106. For example, the user may be able to utilize the content receiver to create one or more images encouraging their children to eat more vegetables and less desert foods. The content receiver may then store such created subliminal content in the storage medium. In other implementations, the user may select from a library of available subliminal content that is already stored in the storage medium. For example, such a library of available subliminal content may include images pre-designed to encourage exercise, discourage overeating, overcome addiction, and so on. In still other implementations, the user may select from a library of subliminal content that is available from the content provider 102. In yet other implementations, the input component 106 may be operable to receive already existing subliminal content from the user, such as via a flash drive, a network connection, and so on. Regardless of the location and/or origin of the subliminal content selected by the user, the processing unit 105 may obtain and insert such subliminal content as specified in the subliminal frame insertion setting.

The subliminal content may be associated with a message to subliminally convey to a human viewer of the content, such as a message relating to learning of information, behavior modification, performing therapy, and so on. The message associated with the subliminal content may be chosen by a user based on the subliminal content that the user chooses to insert in the content. For example, if a user wishes to teach their child mathematics, the user may select subliminal content relating to the presentation of images of multiplication tables and so on.

In some implementations, the content may include video content. In such implementations, the subliminal content may include one or more images. However, in other implementations, the content and/or the subliminal content may each include one or more various kinds of content, such as video, audio, data, and so on.

In one or more embodiments, the subliminal frame insertion setting may specify one or more conditions for subliminal content to be inserted. For example, the user may wish the content to be played with the subliminal content when the content is played for the user's children, but not the user. As such, the user may set the subliminal frame insertion setting to specify subliminal content insertion for content the user's children view but not the user, for content that is played during times when the user is not viewing but the user's children are, and so on.

Further, the subliminal frame insertion setting may specify insertion of subliminal content based on one or more characteristics of the content. Such characteristics may include a rating of the content, a description of the content, and so on. When the processing unit 105 determines that the subliminal frame insertion setting specifies insertion based on characteristics of the content, the processing unit may determine whether the content includes those characteristics. The processing unit may analyze characteristics of the content by examining electronic programming guide information, which may be included with the content. The processing unit then may or may not insert one or more particular subliminal content frames based on the evaluated characteristics of the content.

By way of a first example, a user may desire presentation of subliminal content to his children but not himself. The user's children may primarily view content that is rated for children, but the user may not view such content. As such, the user can select subliminal content to be presented to his children and not himself by setting the subliminal frame insertion setting to restrict insertion of the subliminal content to that content which is rated for children.

By way of a second example, a user may want their children to avoid content that includes graphic violence. In this example, the user may not wish to block such content, but may instead wish to modify her children's behavior such that they do not select such content on their own. As such, the user may set the subliminal frame insertion setting to insert distasteful images in content that has a rating of graphic violence. When the user's children view content that includes the distasteful images, the user's children may subliminally associate emotions of disgust with graphic violence and may learn to avoid content including such graphic violence.

By way of a third example, a user may want their children to view educational content and avoid non-educational content. The user could possibly block any content that is not educational, but the fact that only educational content is available may, in some instances, not stimulate the children to view the educational content. As such, the user may set the subliminal frame insertion setting to insert an image of them smiling in content that has an educational description an image of them frowning in content that does not have an educational description. When the user's children view content, they may subliminally associate emotions of approval with the educational content and disapproval with the non-educational content. As such, the children may learn to prefer the educational content over the non-educational content.

In some implementations, the processing unit 105 may protect the subliminal frame insertion setting utilizing one or more access controls, such as a password, to facilitate ensuring that only the user has control over the subliminal frame insertion setting. Thus, the user has control of the subliminal content that is inserted and when and people other than the user cannot change the subliminal frame insertion setting unless the user allows them to do so. This may prevent the user's children from disabling subliminal learning that the user has designed for them, modifying behavior of the user, and so on.

Although the system 100 is shown and described above in the context of the content provider 102 providing a single stream of content to the content receiver 101 via the transmission medium 103, it is understood that other configurations are possible without departing from the scope of the present disclosure. For example, the content provider may multiplex multiple streams of content and provide the multiplexed content to the content receiver. The content receiver may then demultiplex and select one or more streams of the content. Additionally, the content provider may encrypt content, scramble content, and so on before providing the content via the transmission medium. In such cases, upon receipt of content the content receiver may appropriately decrypt received content, descramble received content, and so on. Further, the content provider may include various components for providing content and performing other functions without departing from the scope of the present disclosure. For example, the content provider may include one or more programming sources, storage networks, broadcast centers, head end components, and so on, which may be arranged in a variety of configurations without departing from the scope of the present disclosure.

Figure 2:
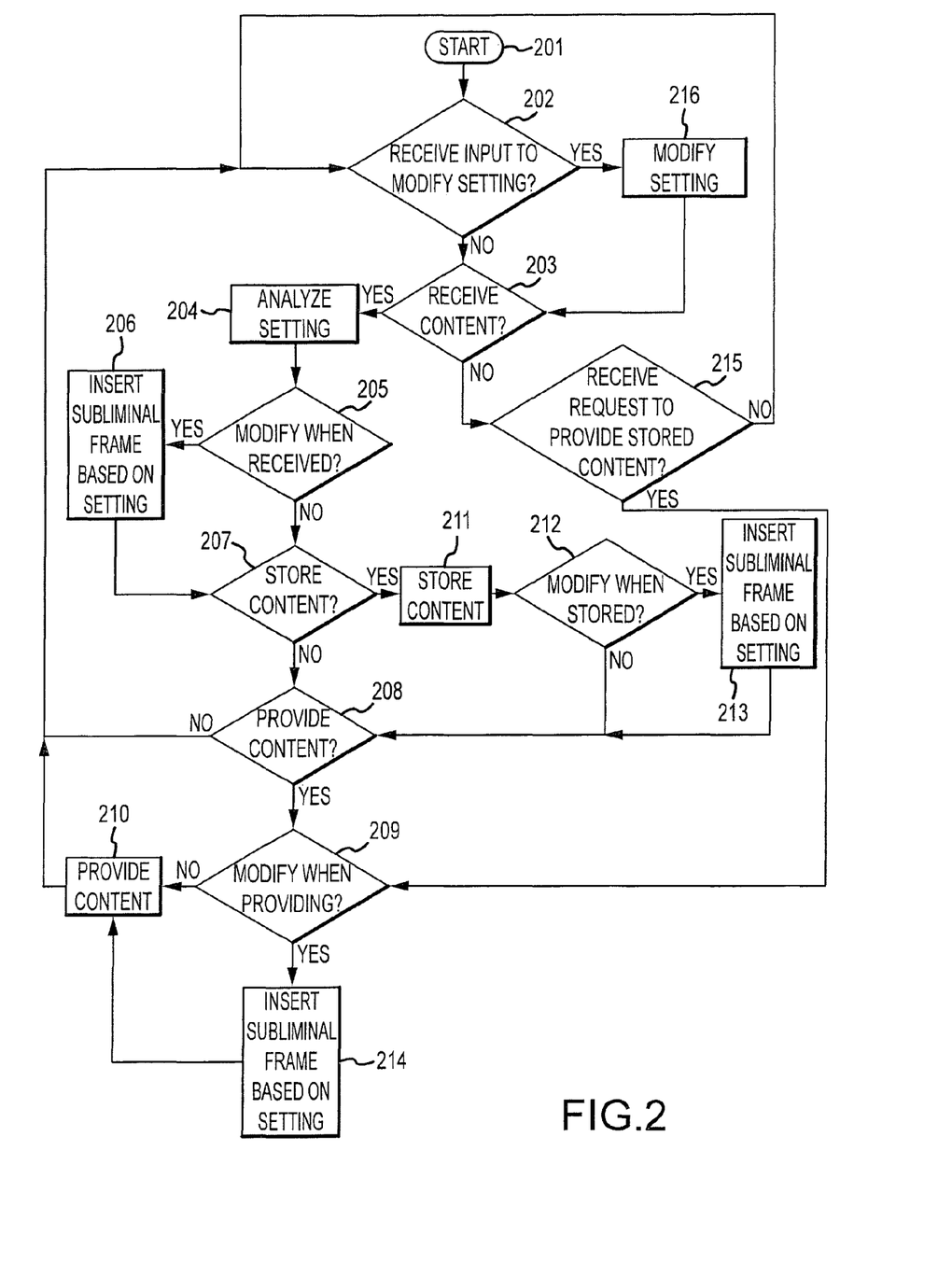
FIG. 2 is a flow chart illustrating a method of subliminal frame insertion that may be performed by the system of FIG. 1.

FIG. 2 illustrates a method 200 of subliminal frame insertion which may be performed by the processing unit 105. The flow begins at block 201 and the flow proceeds to block 202 where the processing unit determines whether input has been received that specifies to modify the subliminal frame insertion setting. If the processing unit determines the input has been received, the flow proceeds to block 216 where the processing unit modifies the subliminal frame insertion setting according to the input. The flow then proceeds to block 203. However, if the processing unit determines at block 202 that the input has not been received, the flow proceeds to block 203 where the processing unit determines whether content has been received.

At block 203, the content has not been received, the flow proceeds to block 215. However, if the content has been received, the flow proceeds to block 204. At block 204, the processing unit analyzes the subliminal frame insertion setting and the flow proceeds to block 205. At block 205, the processing unit determines whether the subliminal frame insertion setting specifies to insert one or more frames of subliminal content when content is received. If the subliminal frame insertion setting specifies to insert one or more frames of subliminal content when content is received, the flow proceeds to block 206 where the processing unit inserts the frames of subliminal content as specified by the subliminal frame insertion setting before the flow proceeds to block 207. Otherwise, the flow proceeds from block 205 to 207.

At block 207, the processing unit determines whether to store the received content. If the processing unit determines to store the received content, the flow proceeds to block 211 where the processing unit stores the received content. Otherwise, the flow proceeds to block 208 where the processing unit determines whether to provide the received content. At block 211, after the processing unit has stored the received content, the flow proceeds to block 212 where the processing unit determines whether the subliminal frame insertion setting specifies to insert one or more frames of subliminal content when content is stored. If the subliminal frame insertion setting specifies to insert one or more frames of subliminal content when content is stored, the flow proceeds to block 213 where the processing unit inserts the frames of subliminal content as specified by the subliminal frame insertion setting before the flow proceeds to block 208. Otherwise, the flow proceeds from block 212 to 208.

At block 208, if the processing unit determines to provide the received content, the flow proceeds to block 209. Otherwise the flow returns to block 202 where the processing unit determines whether input has been received that specifies to modify the subliminal frame insertion setting. At block 209, after the processing unit determines to provide the received content, the processing unit determines whether the subliminal frame insertion setting specifies to insert one or more frames of subliminal content when content is provided. If the subliminal frame insertion setting specifies to insert one or more frames of subliminal content when content is provided, the flow proceeds to block 214 where the processing unit inserts the frames of subliminal content as specified by the subliminal frame insertion setting before the flow proceeds to block 210. Otherwise, the flow proceeds from block 209 to 210. At block 210 the processing unit provides the received content before returning to block 202 where the processing unit determines whether input has been received that specifies to modify the subliminal frame insertion setting.

At block 215, after the processing unit determines content has not been received, the processing unit determines whether a request to provide stored content has been received. If the request has been received, the flow proceeds to block 209 where the processing unit determines whether the subliminal frame insertion setting specifies to insert one or more frames of subliminal content when content is provided. Otherwise, the flow returns to block 202 where the processing unit determines whether input has been received that specifies to modify the subliminal frame insertion setting.

Figure 3A:
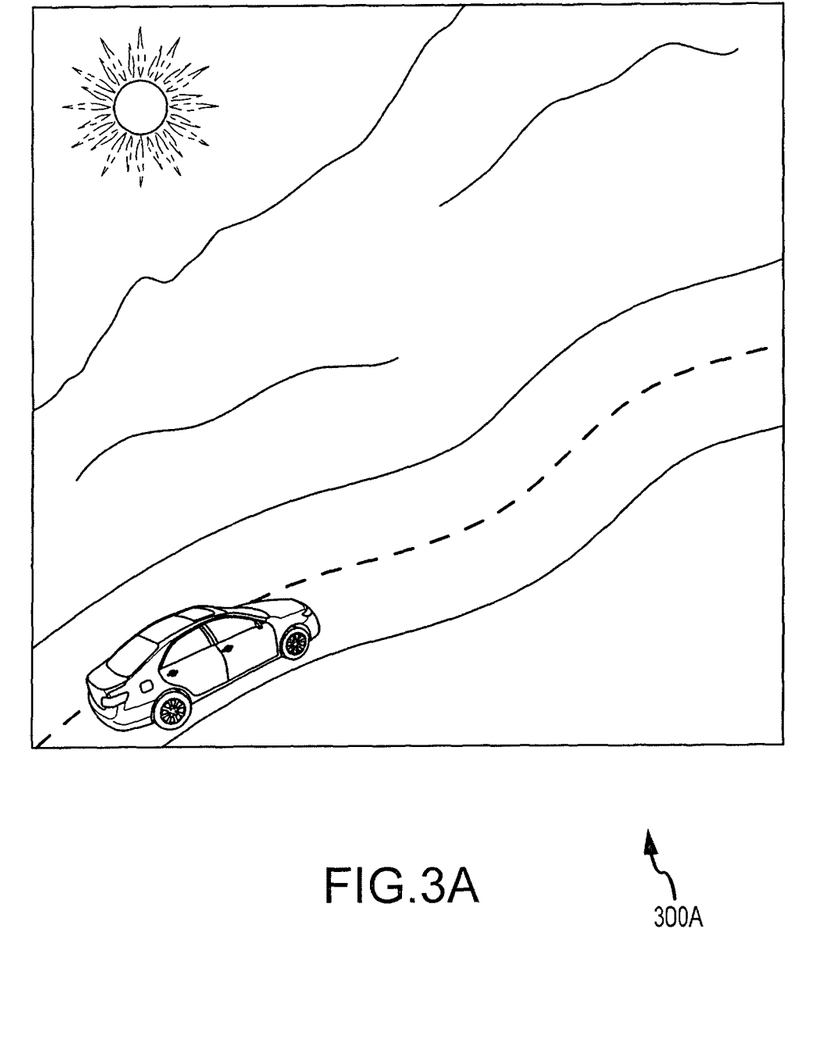
FIGS. 3A-3D illustrate images displayed during playing of an example video content.
Figure 3B:
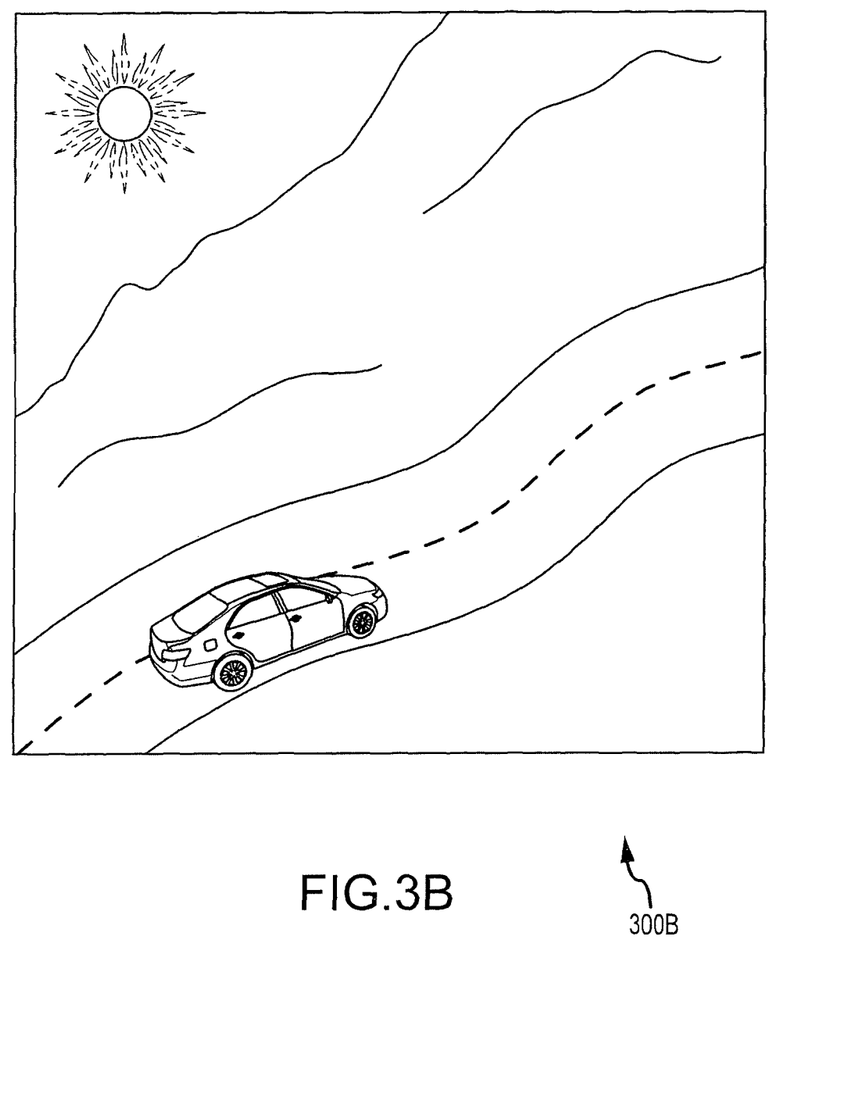
Figure 3C:
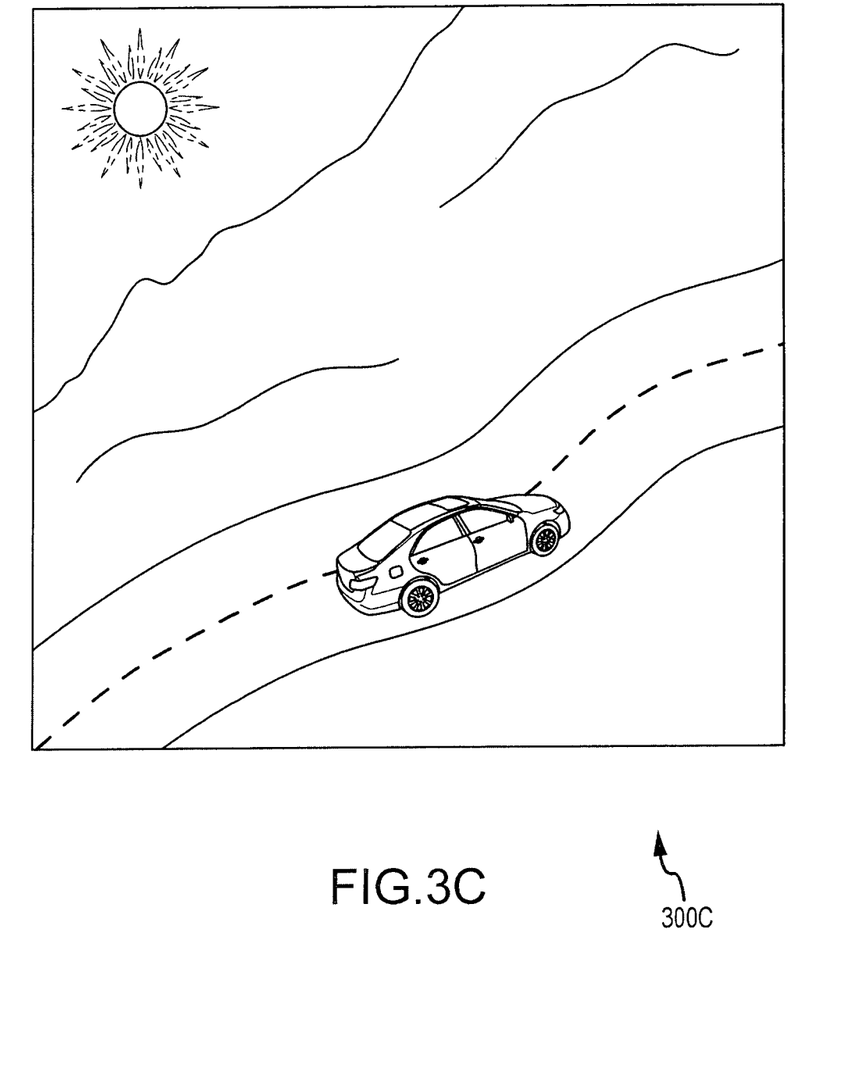
Figure 3D:
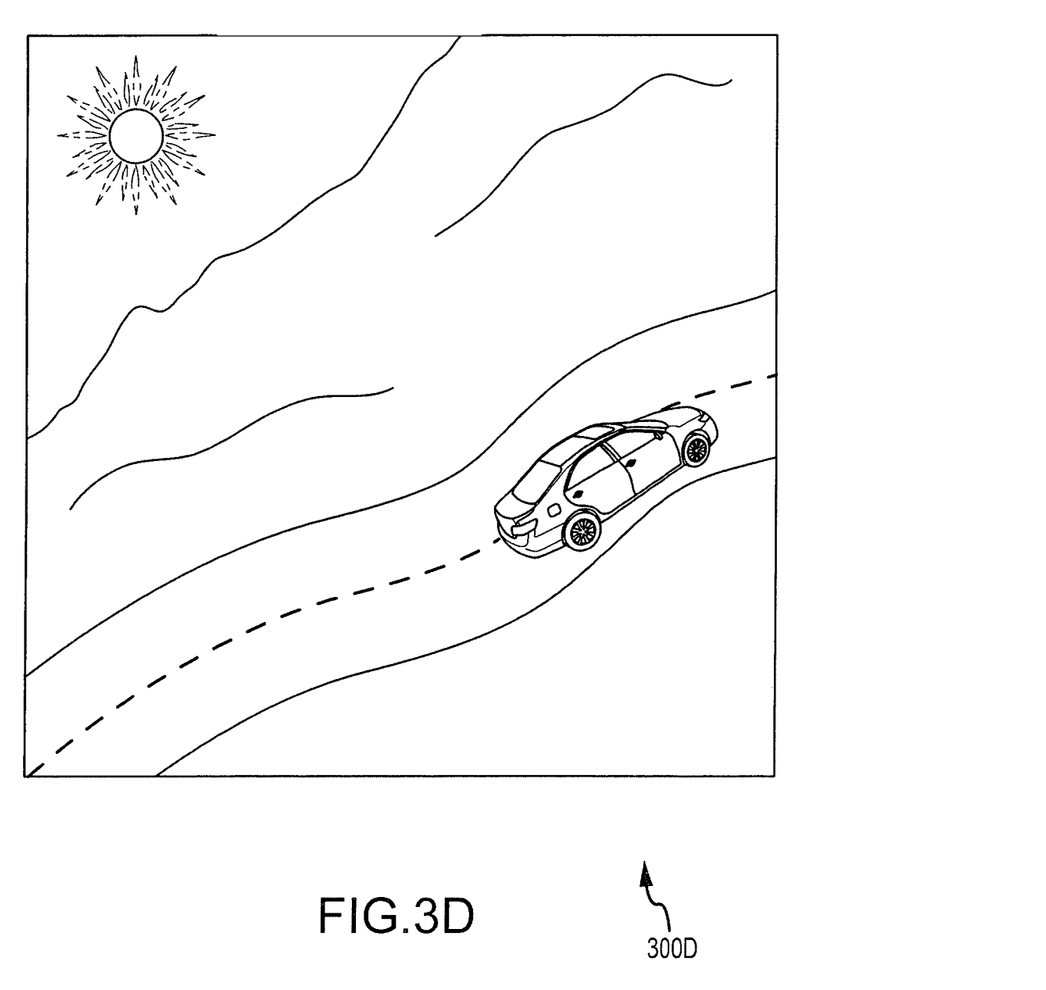
Figure 3E:
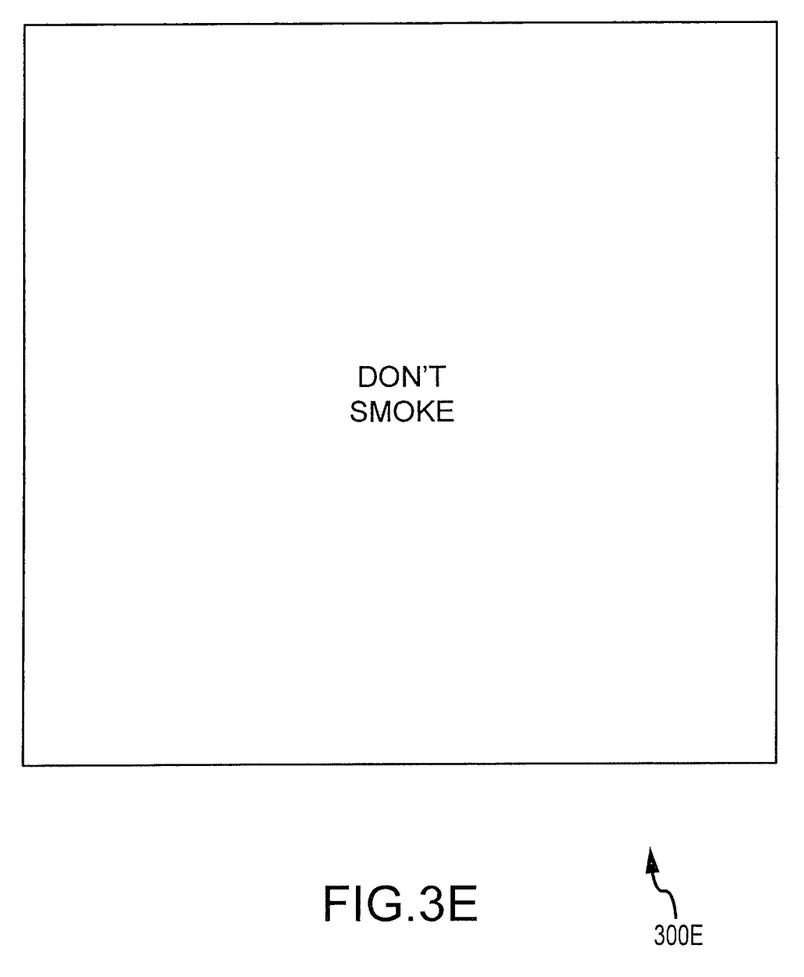
FIG. 3E illustrates an image that may be inserted in the example video content illustrated in FIGS. 3A-3D by the system of FIG. 1.

FIGS. 3A through 3D illustrate images 300A-300D that may be displayed during play of an example video content. Although not illustrated, the example video content may be accompanied by other content, such as audio content, data content, and so on. As illustrated, the example video content includes a car that moves from the bottom left (see FIG. 3A) to the top right (see FIG. 3D) as the example video content is played. FIG. 3E illustrates an image 300E of a subliminal content frame that a user may specify to insert in the example video content. As illustrated, the subliminal content frame corresponds to a subliminal message designed to discourage smoking.

In performing the method 200, the processing unit 105 may insert the image 300E in the example video content such that it is displayed between images 300A and 300B, 300B and 300C, and so on. The processing unit may insert the image 300E such that display of the image 300E is subliminally perceptible but consciously imperceptible to a human viewer of the example video content. Thus, the human viewer's behavior may be modified by subliminal learning such that they choose not to smoke.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for subliminal frame insertion in a content receiver including a processor and at least one memory communicatively connected to the at least one processor, the method comprising:
   receiving content by the content receiver;
   analyzing, utilizing the content receiver, a subliminal frame insertion setting; and
   modifying the content, utilizing the content receiver, by periodically inserting at least one subliminal frame based on the subliminal frame insertion setting, the inserted at least one subliminal frame being subliminally perceptible but consciously imperceptible to a human viewer when the modified content is played, wherein the inserting the at least one subliminal frame replaces at least one frame of each portion of the content that corresponds to an interval of time with the at least one subliminal frame.

2. The method of claim 1, further comprising receiving the at least one subliminal frame based on input from a user.

3. The method of claim 1, wherein the content comprises at least video content.

4. The method of claim 1, wherein the subliminal frame insertion setting is set based on input received from a user.

5. The method of claim 1, wherein the subliminal frame insertion setting specifies at least one of a period for periodically inserting the at least one subliminal frame, a location of the at least one subliminal frame to insert, or at least one condition for insertion of the at least one subliminal frame.

6. The method of claim 1, wherein the at least one subliminal frame that is inserted is selected based on at least one characteristic of the content.

7. The method of claim 6, wherein the at least one characteristic of the content comprises at least one of a rating of the content or a description of the content.

8. The method of claim 6, wherein the at least one characteristic of the content is included in electronic programming guide information for the content.

9. The method of claim 1, wherein the content receiver performs said operation of modifying the content upon receiving the content.

10. The method of claim 1, wherein the content receiver stores the content in at least one non-transitory storage medium upon receiving the content and wherein the content receiver performs said operation of modifying the content by modifying the stored content.

11. The method of claim 1, further comprising outputting the modified content from the content receiver to at least one presentation device.

12. The method of claim 11, wherein the content receiver performs said operation of modifying the content when providing the modified content.

13. A system for subliminal frame insertion, comprising:
an input component operable to receive content for a content receiver;
at least one non-transitory storage medium configured to store a subliminal frame insertion setting for the content receiver and at least one subliminal frame; and
at least one processing unit communicatively connected to the input and storage medium and configured to analyze the subliminal frame insertion setting and modify the content by periodically inserting the at least one subliminal frame in the content based on the subliminal frame insertion setting by replacing at least one frame of each portion of the content that corresponds to an interval of time with the at least one subliminal frame, the at least one subliminal frame that is inserted being subliminally perceptible but consciously imperceptible to a human viewer when the modified content is played.

14. The system of claim 13, further comprising at least one user input device communicatively coupled to the at least one input, wherein at least one of the at least one subliminal frame stored in the at least one non-transitory storage medium was received from a user via the at least one user input device or the subliminal frame insertion setting was set by the at least one processing unit based on input received from the user via the at least one user input device.

15. The system of claim 13, wherein the subliminal frame insertion setting specifies at least one of a period for periodically inserting the at least one subliminal frame, a location of the at least one subliminal frame to insert, or at least one condition for insertion of the at least one subliminal frame is inserted.

16. The system of claim 13, wherein the at least one processing unit is configured select the at least one subliminal frame for insertion based on at least one characteristic of the content.

17. A non-transitory computer-readable storage medium having computer-executable instructions stored thereon that, when executed by at least one processor to:
receive video content;
analyze a subliminal frame insertion setting of a content receiver;
modify the video content by periodically inserting at least one subliminal image frame based on the subliminal frame insertion setting by replacing at least one frame of each portion of the content that corresponds to an interval of time with the at least one subliminal frame; and
output the modified video content to at least one presentation device, the at least one subliminal image frame being subliminally perceptible but consciously imperceptible to a human viewer when the modified video content is played.

18. A content receiver comprising:
at least on processor; and
at least one memory communicatively coupled to the at least one processor, the memory having computer executable instructions stored thereon that, when executed by the at least one processor cause the at least one processor to cause the content receiver to:
receive content;
analyze a subliminal frame insertion setting of the content receiver; and
modify the content, by periodically replacing at least one frame of the received content with at least one subliminal frame based on the analysis of the subliminal frame insertion setting, wherein the replacing at least one frame of the received content includes periodically replacing at least one frame of the received content with at least one subliminal frame based on a subliminal frame insertion setting in a manner such that the inserted at least one subliminal frame is subliminally perceptible but consciously imperceptible to a human viewer when the modified content is played.

* * * * *